(12) United States Patent
Ikegami et al.

(10) Patent No.: US 6,659,510 B1
(45) Date of Patent: Dec. 9, 2003

(54) PIPE-END-CONNECTING JOINT

(75) Inventors: Hiroshi Ikegami, Osaka (JP); Yasuhiro Kikumori, Osaka (JP); Toshihiro Nakanishi, Osaka (JP); Susumu Okairi, Osaka (JP); Nobuo Shindo, Osaka (JP); Tatsuya Machino, Osaka (JP)

(73) Assignee: Totaku Industries, Inc., Takatsuki (JP)

( * ) Notice: Subject to any disclaimer, the term of this patent is extended or adjusted under 35 U.S.C. 154(b) by 0 days.

(21) Appl. No.: 09/383,982

(22) Filed: Aug. 26, 1999

(30) Foreign Application Priority Data

Aug. 28, 1998 (JP) .......................................... 10-259383

(51) Int. Cl.⁷ ................................................. F16L 33/00
(52) U.S. Cl. ...................... 285/243; 285/253; 285/903; 285/251
(58) Field of Search ............................. 285/253, 222.1, 285/222.2, 222.3, 222.4, 256, 373, 243, 903, 25

(56) References Cited

U.S. PATENT DOCUMENTS

| | | | | |
|---|---|---|---|---|
| 237,324 A | * | 2/1881 | Reynolds | 285/253 |
| 817,060 A | * | 4/1906 | Greenfield | 285/253 |
| 992,426 A | * | 5/1911 | James | 285/253 |
| 1,587,327 A | * | 6/1926 | Johnson | 285/253 |
| 3,249,371 A | * | 5/1966 | Peterman | 285/253 |
| 3,257,132 A | * | 6/1966 | Lyons | 285/253 |
| 3,432,190 A | * | 3/1969 | Kunz | 285/253 |
| 3,495,855 A | * | 2/1970 | Currie | 285/253 |
| 4,124,236 A | * | 11/1978 | Guidry | 285/373 |
| 4,486,035 A | | 12/1984 | Storke | |
| 4,486,036 A | * | 12/1984 | Storke et al. | 285/253 |
| 4,635,973 A | | 1/1987 | Sauer | |
| 4,758,029 A | * | 7/1988 | Davis | 285/253 |
| 4,871,198 A | * | 10/1989 | Hattori et al. | 285/373 |

FOREIGN PATENT DOCUMENTS

| | | | | |
|---|---|---|---|---|
| GB | 86 | * | 10/1898 | 285/253 |
| GB | 8840 | * | 4/1902 | 285/253 |

* cited by examiner

Primary Examiner—Robert J. Sandy
Assistant Examiner—Dinesh Melwani
(74) Attorney, Agent, or Firm—McGinn & Gibb, PLLC (57) ABSTRACT

A pipe-end-connecting joint comprisse a nipple 1 inserted in the pipe end, a holder 2 for tightening the outer circumference of the pipe end, and an elastic packing 3 divided into half parts and attached in the holder 2. The nipple 1 includes a tubular portion 11 provided in one longitudinal end side thereof so as to be inserted in the pipe end, a connection portion 12 provided in the other longitudinal end side thereof so as to be connected to another joint, and a flange portion 13 provided in a longitudinal intermediate portion thereof so as to protrude outward. The holder 2 is divided longitudinally into two split parts 2A and 2B so that each of the two split parts 2A and 2B has an semicircularly formed inner circumferential surface 21, and each of the two split parts 2A and 2B has one longitudinal end side in which one of the half parts of the elastic packing is mounted, and has the other longitudinal end side in which a ring-like groove 23 is formed so as to be fitted to the flange portion 13, and further has a longitudinally intermediate portion between the one and the other longitudinal end sides in which a spiral corrugated portion 22 is formed along the outer circumferential surface of the pipe P, the spiral corrugated portion 22 having a spiral protruding portion 24 an inner diameter of which is smaller than an outer diameter of a trough portion r of the pipe P, the two split parts 2A and 2B having holes for insertion of connection bolts.

32 Claims, 7 Drawing Sheets

PIPE-END-CONNECTING JOINT

BACKGROUND OF THE INVENTION

The present invention relates to a pipe joint which is used so as to be attached to a pipe end of a spiral corrugated pipe, and particularly relates to a pipe joint which is preferably used so as to be attached to a pipe end of a synthetic resin pipe having a spiral corrugated outer circumferential surface and having a pipe wall with reinforcing yarn buried therein.

A conventional technique for connecting synthetic resin spiral corrugated pipes of this type is as follows. In a place where such spiral corrugated pipes were used, pipe ends of two spiral corrugated pipes were inserted into a cylindrical pipe joint from opposite sides of the joint so as to make the pipe ends abut on each other. Sealing means were applied to the spiral corrugated pipes respectively before or after the insertion of the pipes. Thus, the two spiral corrugated pipes were connected to or coupled with each other.

Figure 7:
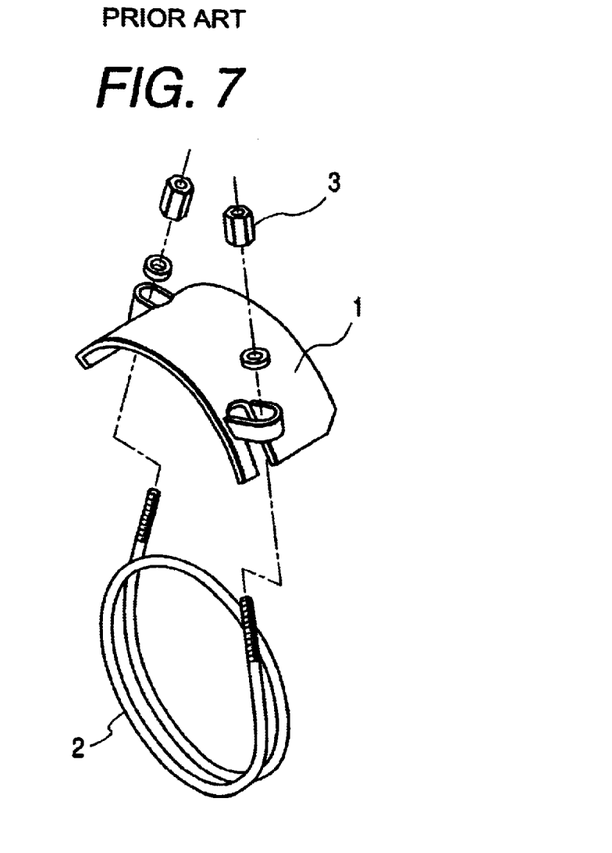
FIG. 7 is an exploded perspective view showing a conventional joint.
Figure 8:
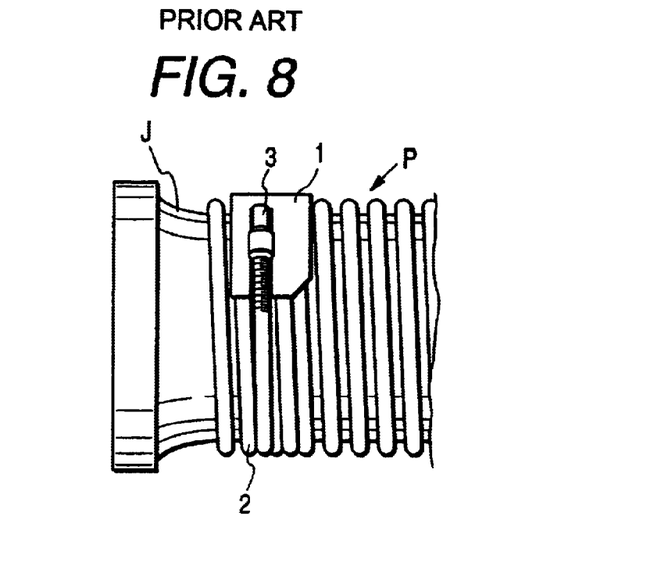
FIG. 8 is a front view showing a state of using the conventional joint.

Another conventional technique is as follows. As shown in FIGS. 7 and 8, a nipple J having a simple tubular end portion widened so as to be shaped like a trumpet was forced into a pipe end of a synthetic resin spiral corrugated pipe P. Then, a thick wire member 2 was wound on a trough portion of an outer circumferential portion of the pipe by one and a half turns. Then, ends of the wire member 2 were compressively tightened by nuts 3 through a saddle metal member 1.

Connection of spiral corrugated pipes of this type had to be made at a site of the pipe laying-out which was not always in a desirable environment and by a worker who was not always a skilled or professional worker while being influenced by atmospheric temperature and weather. Particularly the former conventional technique had a problem that a connection could not be made speedily because a great deal of time and labor were required. Further, in each of the two conventional techniques, not only water leakage occurred easily as the internal pressure of the pipe increased even in the case where sufficient connecting work was performed, but also such an accident of metal fitting's falling out of the pipe occurred frequently before the internal pressure of the pipe reaches a critical pressure of the pipe.

Figure 1:
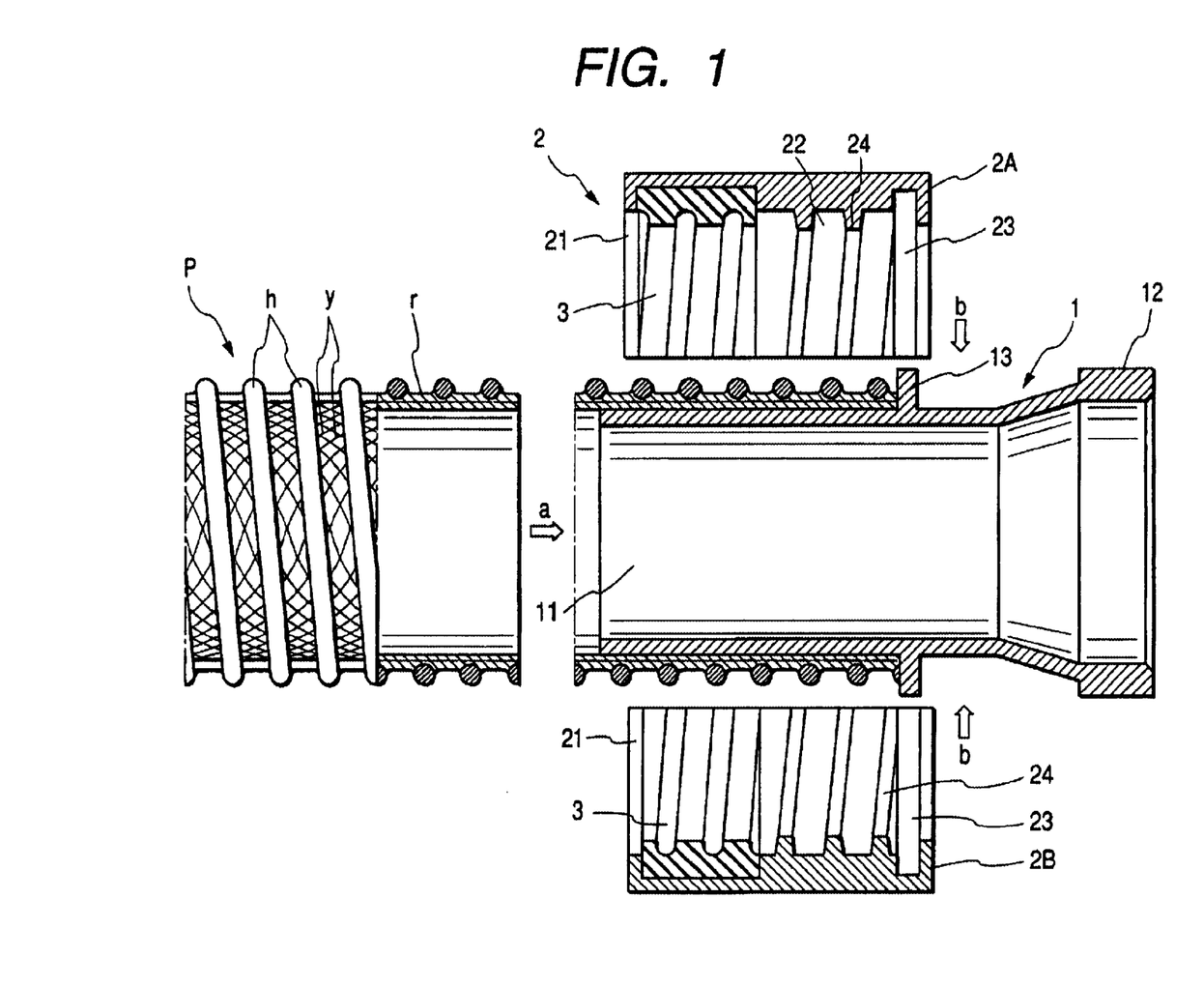
FIG. 1 is an exploded central longitudinal sectional view of respective portions showing a first embodiment.
Figure 6:
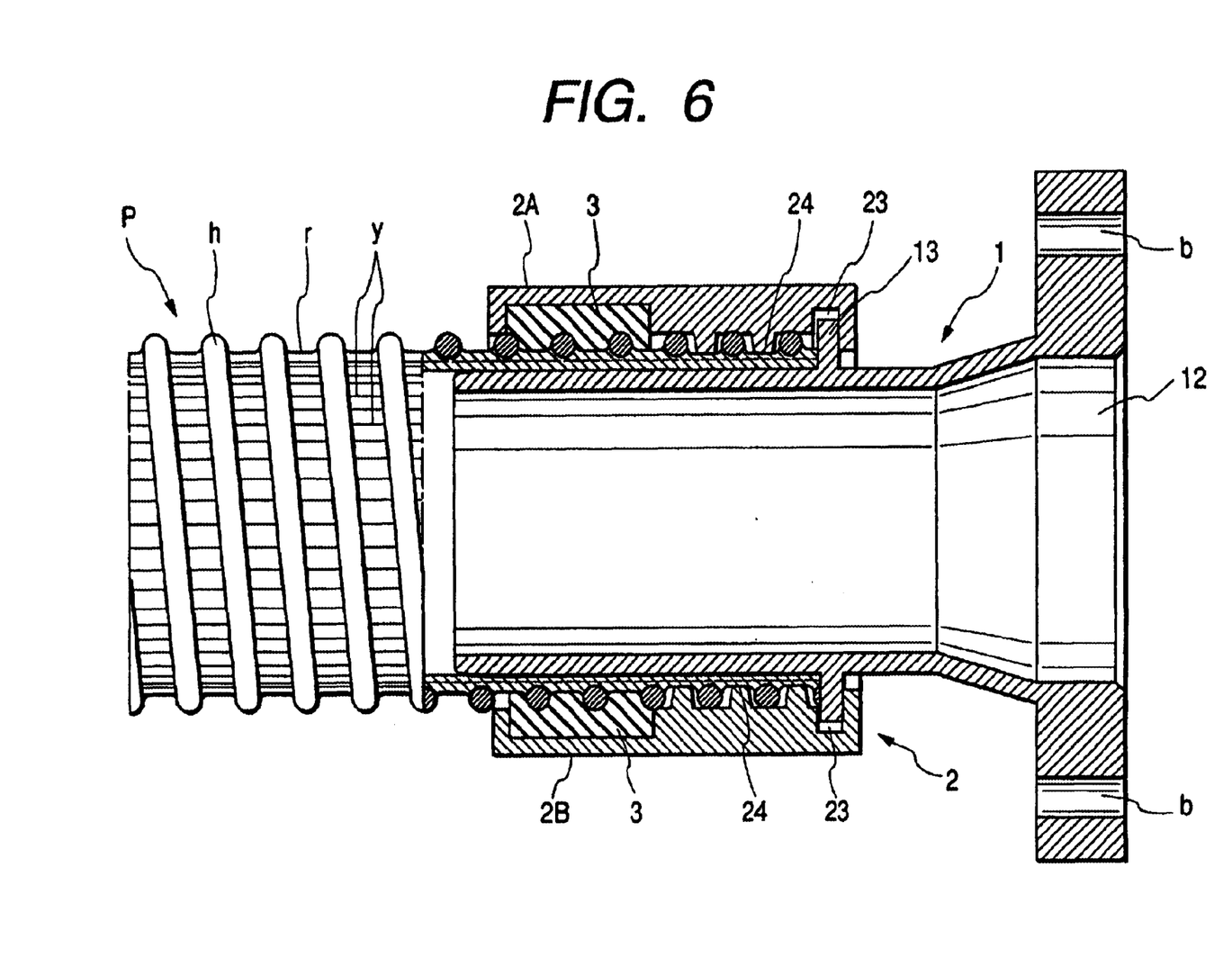
FIG. 6 is a central longitudinal sectional view of portions corresponding to those of FIG. 2, showing a second embodiment.

Particularly in the case where the pipe used herein was a pipe having a large number of reinforcing yarn members y in its pipe wall as represented by a synthetic resin pipe P shown in FIGS. 1 and 6, even if the connection of the joint to the pipe looked sufficient from external appearance, respective cut ends of the reinforcing yarn members y at a cut end of the pipe were moved successively so as to be pulled into the longitudinal inner deeper side of the pipe by the repetition of expanding and meandering operations which occurred in the pipe whenever a large amount of water or air pressure was applied to the inside of the pipe. Accordingly, a portion near the cut end of the pipe was provided as a region which contained a resin material alone so that the reinforcing yarn members y were absent from the region. As a result, the strength of the coupling portion between the pipe and the joint was lowered. This was a cause of water leakage and further a factor leading to an explosion of the pipe.

SUMMARY OF THE INVENTION

Therefore, it is an object of the present invention to solve the aforementioned problems in the conventional pipe joint. In particular, it is an object of the present invention to provide a pipe joint which can be connected to a pipe end of a synthetic resin spiral corrugated pipe in a factory by a skilled worker in advance and which can be surely and easily connected to a pipe end even at a pipe laying-out site. Thus, pipes can be connected with each other easily and speedily.

Further, the reinforcing yarn members y can be sufficiently prevented from moving from a cut end portion of a pipe toward a longitudinally inner deeper side of the pipe even if the pipe contains a large number of reinforcing yarn members y in its pipe wall. Accordingly, the strength at the cut end portion of the pipe can be prevented from being lowered. Thus, the pipe joint can be connected to the pipe in such a state that neither water leakage nor pipe explosion occurs easily.

The above object according to the present invention can be achieved by a pipe-end-connecting joint connected to a pipe end of a synthetic resin pipe P formed so as to have a spiral corrugated outer circumferential surface and have a pipe wall with reinforcing yarn buried therein, the joint comprising a nipple inserted in the pipe end, a holder for tightening the outer circumference of the pipe end, and an elastic packing divided into half parts and attached in the holder. The nipple includes a tubular portion provided in one longitudinal end side thereof so as to be inserted in the pipe end, a connection portion provided in the other longitudinal end side thereof so as to be connected to another joint, and a flange portion provided in a longitudinal intermediate portion thereof so as to protrude outward. The holder is divided longitudinally into two split parts so that each of the two split parts has a semicircularly formed inner circumferential surface. Each of the two split parts has one longitudinal end side in which one of the half parts of the elastic packing is mounted, and has the other longitudinal end side in which a ring-like groove is formed so as to be fitted to the flange portion, and further has a longitudinally intermediate portion between the one and the other longitudinal end sides in which a spiral corrugated portion is formed along the outer circumferential surface of the pipe. The spiral corrugated portion having a spiral protruding portion an inner diameter of which is smaller than an outer diameter of a, trough portion r of the pipe when the nipple is inserted in the synthetic resin pipe P.

In the above-mentioned joint, the two split parts preferably have holes for insertion of connection bolts.

In the above-mentioned joint, it is advantageous that the elastic packing is configured so as to be divided into half parts each having an inner surface shaped like a semicircular arc in the same manner as the holder. The inner circumferential surface of the elastic packing is shaped like a spiral uneven surface which is substantially the same as the spiral uneven shape of the outer circumferential surface of the pipe P. That is, the elastic packing is formed so as to adhere closely to the outer circumferential portion of the pipe P without any gap, or at least an inner circumferential surface portion of the elastic packing is formed from an elastically deformable material. For example, the elastic packing is preferably formed from a natural rubber material or a synthetic rubber material.

The material for the half split joint used in the present invention is not limited specifically. For example, a hard thermoplastic synthetic resin material such as hard polyethylene, hard polypropylene, or the like, may be preferably used because the material has weather resistance. Alternatively, the joint may be made from a thermosetting resin. Further, the material is not limited to the synthetic resin material. The present invention can be also be achieved by an FRP resin in which glass fiber is mixed with resin or by a structure in which an iron plate is embedded in a thick layer. The joint made from only the synthetic resin material is, however, preferable in terms of light weight.

DETAILED DESCRIPTION OF THE PREFERRED EMBODIMENTS

Figure 2:
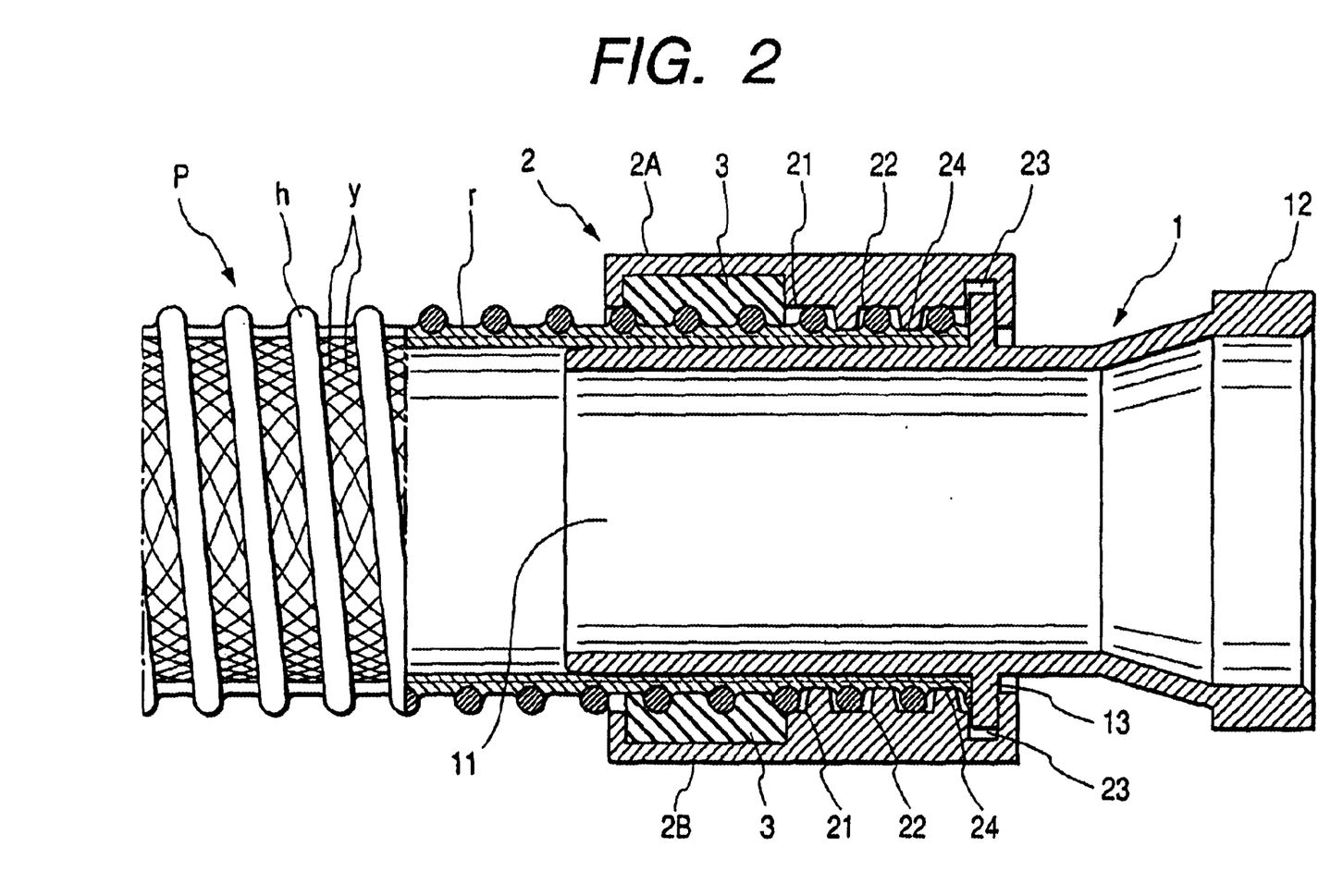
FIG. 2 is a central longitudinal sectional view showing a state in which the joint is connected to the pipe.
Figure 3:
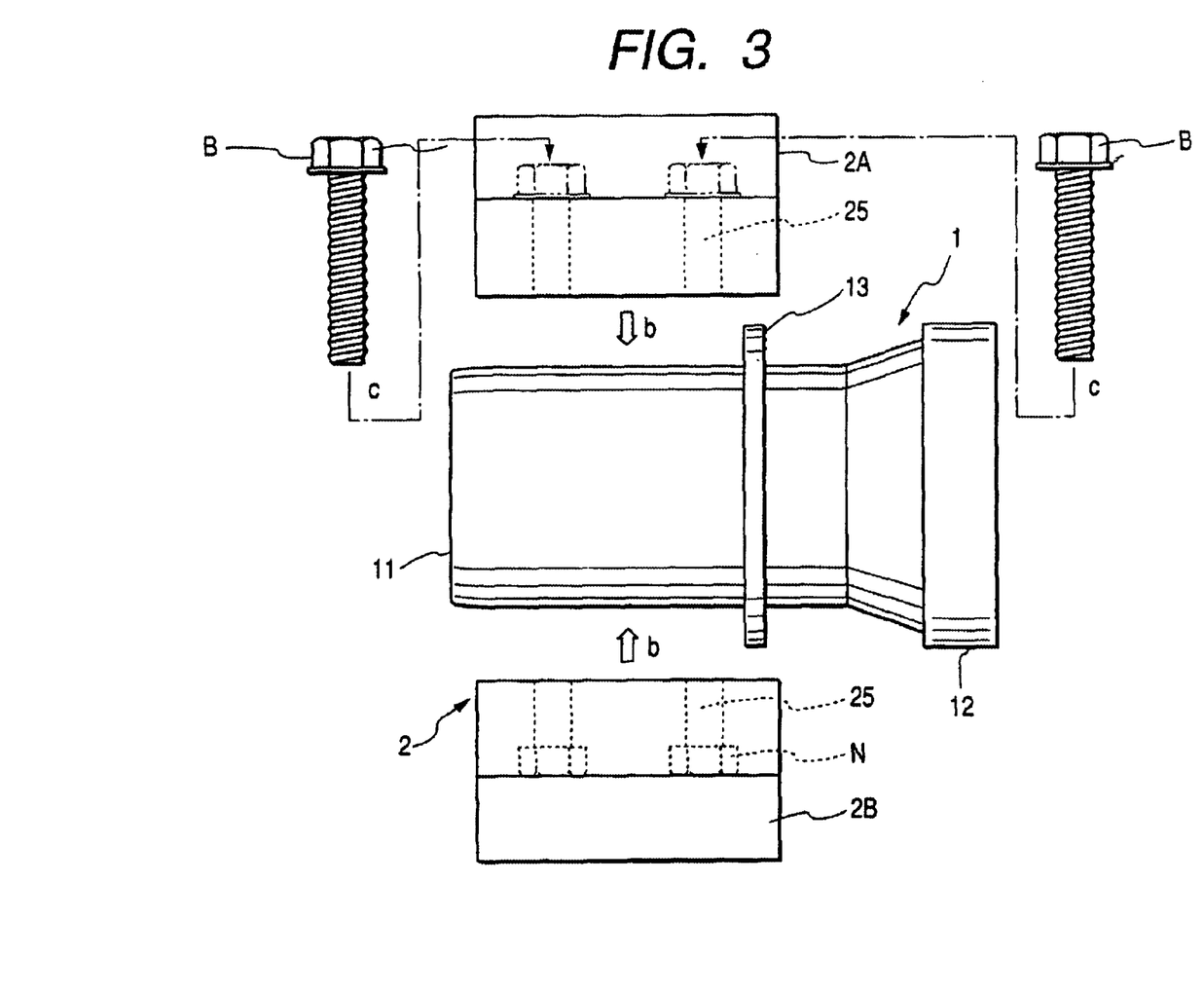
FIG. 3 is an exploded front view showing respective portions.
Figure 4:
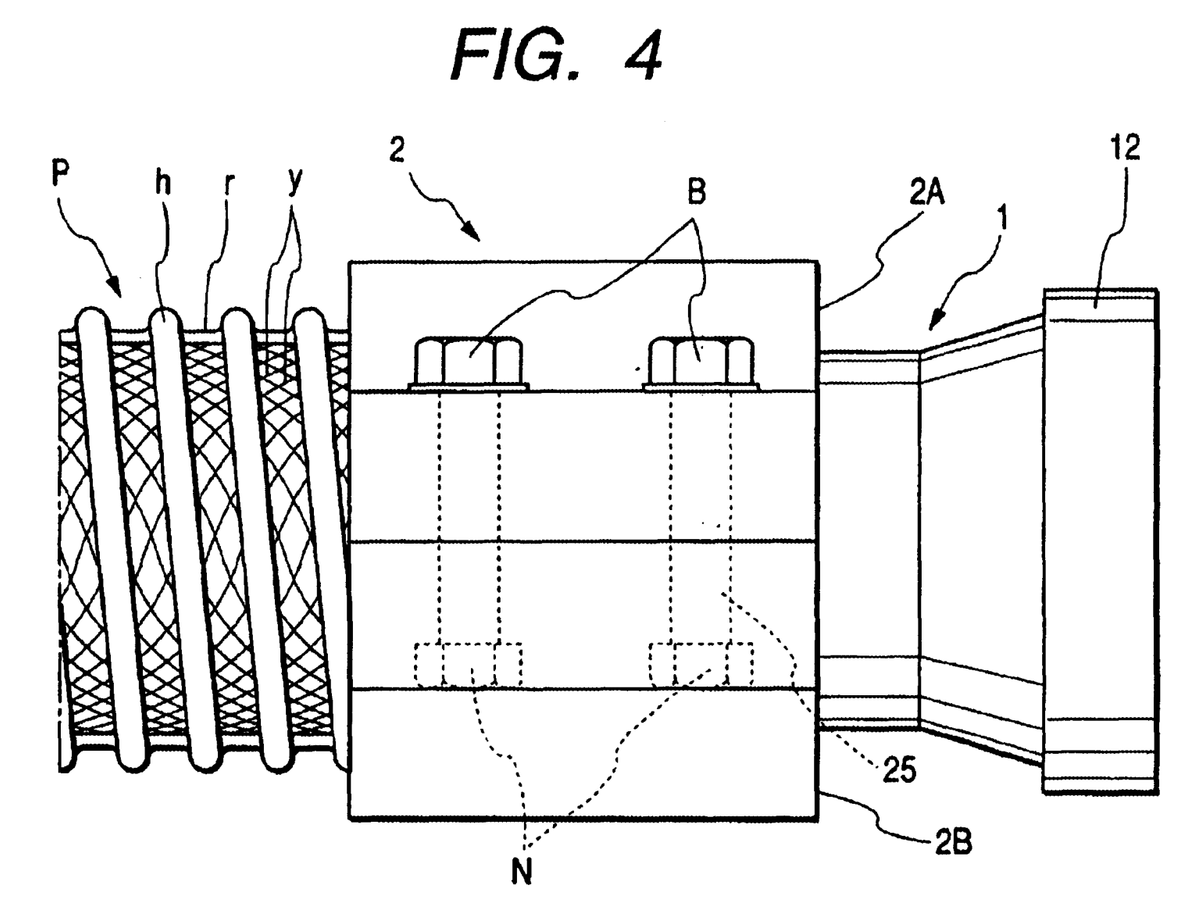
FIG. 4 is a front view showing a state in which the joint is connected to the pipe.
Figure 5:
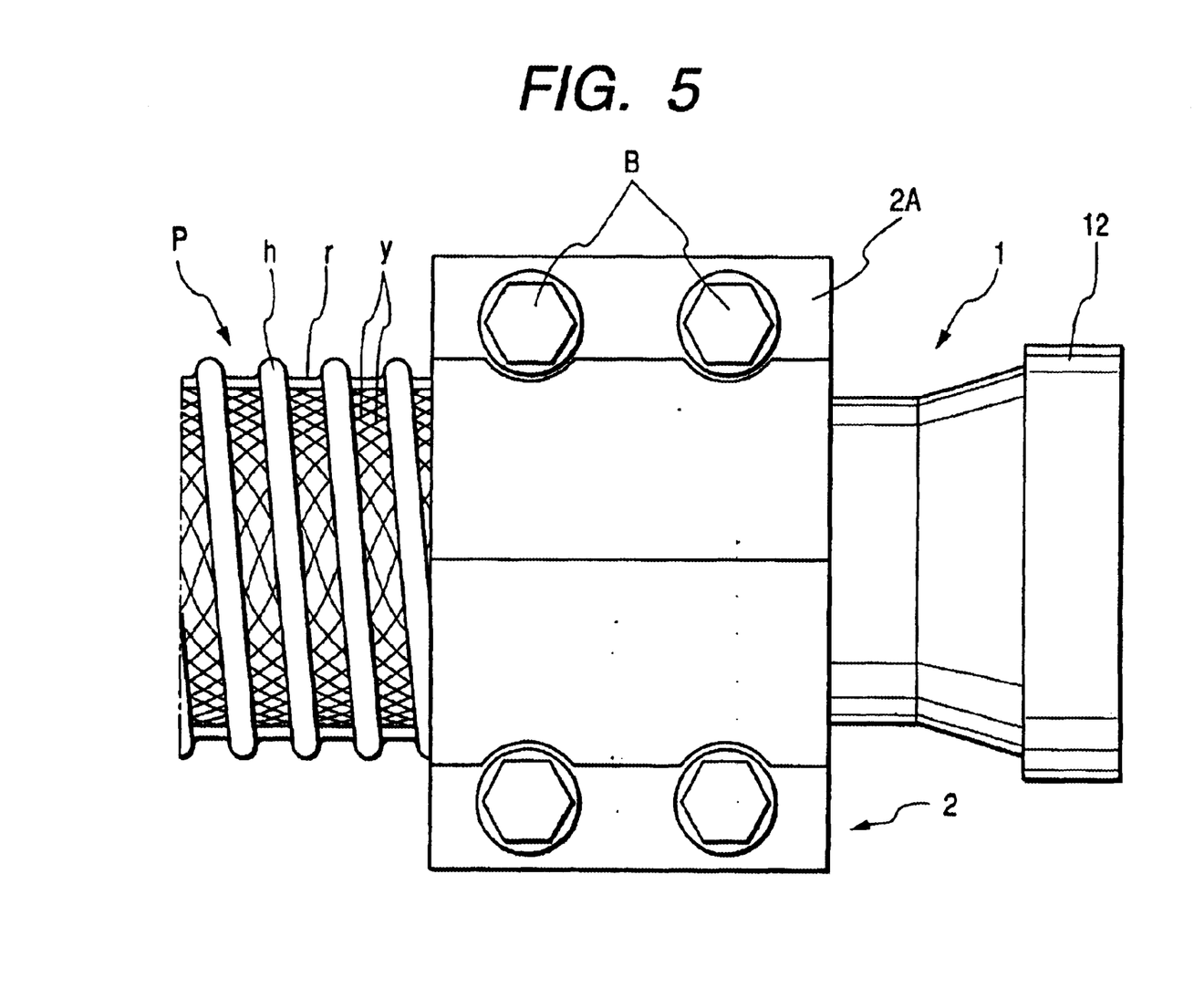
FIG. 5 is a plan view of FIG. 4.

Preferred embodiments of the present invention will be described below with reference to the drawings. FIGS. 1 through 5 show a first embodiment of the pipe-end-connecting joint according to the present invention. FIG. 1 is a central longitudinal sectional view showing a state before the joint is connected to the pipe; FIG. 2 is a central longitudinal sectional view showing a state in which the joint is connected to the pipe; FIG. 3 is an external appearance view showing a state before the joint is connected to the pipe; FIG. 4 is an external appearance view showing a state in which the joint is connected to the pipe; and FIG. 5 is an external appearance view showing a plan-view state of FIG. 4.

As shown in FIGS. 1, 2, etc., the pipe P as a subject to use the joint according to this embodiment has a spiral corrugated outer circumferential surface formed by spirally winding a hard resin wire material h on the outer circumference of a tubular pipe body so as to integrate the hard resin wire material h with the pipe body. The pipe contains a large number of reinforcing yarn members y crossed-spirally buried in its pipe wall by forming the pipe body by inner and outer layers. The pipe body portion is made of a soft PVC resin relatively rich in flexibility. The resin wire material h is made of a hard PVC resin. The reinforcing yarn members y are made from an arrangement of polyester yarn.

On the other hand, the joint connected to a pipe end of such a synthetic resin pipe mainly comprises a nipple 1 to be inserted in the pipe end, a holder 2 for tightening the outer circumference of the pipe end, and an elastic packing 3 used to be attached to the inside of the holder 2.

The nipple 1 is made of a hard PP resin so as to be tubular as a whole. The nipple 1 is provided with a true-circular tubular portion 11, a connection portion 12, and a disk-like flange portion 13. The true-circular tubular portion 11 is provided in a longitudinal end side (left side in the drawings, the same applies hereinafter) so as to be inserted in the pipe end. The connection portion 12 is provided in the other longitudinal end side (right side in the drawings, the same applies hereinafter) so as to be shaped like a trumpet opened outward and having an outer circumferential portion shaped like a wide ring protruding outward so as to be connected to another joint. The disk-like flange portion 13 is provided in a place nearer the longitudinal end side than the trumpet-like widened portion so as to protrude toward the outer circumferential direction.

The holder 2 is constituted by two, upper and lower, split parts 2A and 2B divided along the longitudinal direction. Each of the two split parts 2A and 2B is made of a hard PP resin. As shown in FIGS. 4 and 5, the total shape of the two split parts 2A and 2B is set so that rectangular protruding portions are provided in opposite sides of a cylinder so as to be connected to the cylinder. Each of the two split parts 2A and 2B has an inner circumferential surface 21 shaped like a semicircular arc. The elastic packing 3 divided into half parts is provided in the longitudinal end side so as to be fitted and fixed to the inner circumferential surface 21. A ring-like groove 23 is provided in the other longitudinal end side so as to be fitted to the flange portion 13 of the nipple 1. A portion between the ring-like groove 23 and the packing 3 is formed as a spiral uneven portion 22 fitted to the spiral unevenness of the outer circumferential surface of the pipe P. The inner diameter of a spiral protruding portion 24 provided in the spiral uneven portion 22 so as to protrude toward the inner circumferential side is set to be smaller than the outer diameter of a trough portion r of the pipe P when the nipple 1 is inserted in the pipe P. Tightening connection holes 25 are formed in the outside of the two split parts 2A and 2B so that bolts B are inserted through the holes 25. Nuts N are arranged at lower ends of the bolt holes 25 so as to be buried in the lower split part 2B.

Further, the elastic packing 3 is made from an elastic synthetic rubber material. The elastic packing 3 is divided into half parts each having an inner circumferential surface shaped like a semicircular arc. The inner circumferential surface is spiral corrugatedly formed so as to have the same shape as the spiral unevenness of the outer circumferential surface of the pipe P. The elastic packing 3 is formed so as to adhere-closely to the outer circumferential portion of the pipe P without any gap.

To connect the joint configured as described above in this embodiment to the pipe end of the synthetic resin pipe P configured as described above, as shown in FIG. 1, the nipple 1 is moved relative to the pipe end, or the pipe end of the pipe P is moved relative to the nipple 1 in the direction of the arrow a. The nipple 1 is forced into the pipe P so that a cut end of the pipe P abuts on a side surface of the flange portion 13 of the nipple 1 as represented by the virtual line. In this state, the two split parts 2A and 2B are moved in the directions of the arrows b so as to abut on the outer circumference of the pipe P. Two bolts B on each side, that is, four bolts B in total are inserted in the bolt-connection holes 25 respectively and fitted to embedded nuts N as represented by the arrows c in FIG. 3. When the bolts B are tightened, the connection is completed. In this manner, the joint can be connected to the pipe end as shown in FIGS. 2, 4 and 5.

FIG. 6 shows another embodiment concerning a synthetic resin pipe P having a different structure. The synthetic resin pipe P contains a large number of reinforcing yarn members y which are disposed in its pipe wall so as to be parallel with the longitudinal direction of the pipe. The pipe as a subject to use the pipe-end-connecting joint according to the present invention may be such a synthetic resin pipe. Further, the nipple 1 shown in this embodiment has the connection portion 12 provided in the longitudinal other end side so as to be connected to another joint. The connection portion 12 is formed so that connection bolt holes b . . . passing through the connection portion 12 in the direction of the thickness of the connection portion 12 are formed in a plurality of circumferential places, for example, 6 or 8 places of a large-diameter disk body. In such a manner, the structure of the connection portion 12 provided in the longitudinal other end side of the nipple 1 so as to be connected to another joint is not limited to the specific form.

In order to facilitate better understanding of the present invention, the aforementioned embodiments have shown the case where a pipe in which an outer layer for covering the outer circumferential surface of reinforcing yarn y is made from a transparent material is used as an example of the pipe in which the state of reinforcing yarn y buried in the synthetic resin pipe P is visible from the outside of the pipe P, but it is a matter of course that the pipe may have a pipe body in which not only an outer layer but also an inner layer is made from a transparent material, or may have a pipe body which is made from an opaque material as the pipe wall-forming resin material.

Further, the reinforcing wire material forming a peak portion of the spiral waveform of the pipe P is not limited to the sectionally circular wire material as mentioned in the embodiments. For example, a sectionally trapezoidal wire material, a semicircular wire material, a rectangular wire material or any other generally known wire materials may be used. Further, it is a matter of course that the pipe may be a pipe in which the outer surface of the pipe wall-forming material per se is spiral corrugated.

Although embodiments considered as typical cases of the present invention have been described above, the present invention is not limited to the structure of those embodiments. Changes and modifications may be made within a range of the following effect if the aforementioned constituents of the present invention are provided and the object of the present invention can be achieved.

As is understood from the above description, the pipe-end-connecting joint according to the present invention is configured so that a pipe is brought into pressure contact with a hard nipple and clamped by a holder while a flange portion of the nipple is fitted into a ring-like groove of the holder in a state in which the hard nipple is inserted in a pipe end so as to hold and protect an inner circumferential surface of the pipe. Upon the pressure contact, a portion apart from a cut end of the pipe is subjected to plane pressure contact with the cut end by an elastic packing whereas a trough portion of the pipe, that is, reinforcing yarn which is a portion near the cut end of the pipe is subjected to direct pressure contact by a spiral protruding portion. Accordingly, even in the case where the pipe contains a large number of reinforcing yarn members buried in its pipe wall in order to enhance pressure resistance, reinforcing yarn members can be sufficiently prevented from moving from the cut end portion of the pipe toward the longitudinally inner side of the pipe. Accordingly, the strength of the cut end portion of the pipe can be prevented from being lowered. Even in the case where the internal pressure of the pipe increases, both water leakage and pipe explosion can be sufficiently prevented from occurring. There can be expected a remarkable effect that the pipe-end-connecting joint can be used as a joint for pipelaying with a high internal pressure.

The present invention is based on Japanese Patent Application No. Hei. 10-259383, which is incorporated herein by reference.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A pipe-end-connecting joint connectable to a pipe end of a synthetic resin pipe having a spiral corrugated outer circumferential surface, said joint comprising:
   a nipple adapted to be inserted in a pipe end;
   a holder for tightening the outer circumference of a pipe end; and
   an elastic packing attached in said holder, said elastic packing including two half parts each having an inner surface shaped like a semicircular arc,
   wherein said nipple includes a tubular portion provided in one longitudinal end side thereof so as to be insertable in the pipe end, a connection portion provided in the other longitudinal end side thereof so as to be connected to another joint, and a flange portion provided in a longitudinal intermediate portion thereof so as to protrude outwardly,
   wherein said holder is divided longitudinally into two split parts, each of said two split parts forming a semicircular inner circumferential surface and comprising:
   a first longitudinal end side in which each of said two split parts is fitted on one of the two half parts of said elastic packing;
   a second longitudinal end side in which a ring-like groove is formed so as to be fitted to said flange portion; and
   a longitudinally intermediate portion between said first and second longitudinal end sides, a spiral corrugated portion being formed on said longitudinally intermediate portion of said holder to substantially fit the spiral corrugated outer circumferential surface of the synthetic resin pipe, said spiral corrugated portion having a spiral protruding portion an inner diameter of which is smaller than an outer diameter of a trough portion of a spiral corrugated outer circumferential surface of the synthetic resin pipe, when the nipple is inserted into the synthetic resin pipe,
   wherein said spiral protruding portion has a hardness greater than that of said elastic packing,
   wherein said elastic packing is fitted in a first ring-like groove of an inner circumferential surface of said two split parts on the first longitudinal end side, and the ring-like groove on the second longitudinal end side comprises a second ring-like groove, and
   wherein said elastic packing formed at said first longitudinal end side presses against said synthetic resin pipe in a direction towards said nipple.

2. The pipe-end-connecting joint according to claim 1, wherein at least one of said two split parts has holes and connection bolts for insertion therein.

3. The pipe-end-connecting joint according to claim 2, wherein at least one of said two split parts has nuts which are threadedly engaged with said connection bolts respectively and are embedded therein.

4. The pipe-end-connecting joint according to claim 1, wherein each of said half parts has a spiral corrugated inner circumferential surface which substantially meets with said outer circumferential surface of said pipe,
   wherein each of said half parts is held between the semicircular inner circumferential surface of each of said split parts and the outer circumferential surface of said pipe by a pressure urging said two split parts together around a circumference of said pipe.

5. The pipe-end-connecting joint according to claim 2, wherein each of said half parts has a spiral corrugated inner circumferential surface which substantially meets with said outer circumferential surface of said pipe,
wherein each of said half parts is held between the semicircular inner circumferential surface of each of said split parts and the outer circumferential surface of said pipe by a pressure urging said two split parts together around a circumference of said pipe.

6. The pipe-end-connecting joint according to claim 3, wherein each of said half parts has a spiral corrugated inner circumferential surface which substantially meets with said outer circumferential surface of said pipe,
wherein each of said half parts is held between the semicircular inner circumferential surface of each of said split parts and the outer circumferential surface of said pipe by a pressure urging said two split parts together around a circumference of said pipe.

7. The pipe-end-connecting joint according to claim 1, wherein said synthetic resin pipe includes a pipe wall with a reinforcing yarn buried therein.

8. The pipe-end-connecting joint according to claim 1, wherein said spiral protruding portion presses said trough portion of said spiral corrugated outer circumferential surface of a synthetic resin pipe in a direction towards a side of said nipple.

9. The pipe-end-connecting joint according to claim 1,
wherein a portion of the pipe distal to a cut end of the pipe is subjected to a planar pressure contact by said elastic packing.

10. The pipe-end-connecting joint according to claim 1, wherein a width of said first ring-like groove is greater than a width of said second ring-like groove.

11. The pipe-end-connecting joint according to claim 1, wherein a circumference of said first ring-like groove is larger than a circumference of said second ring-like groove.

12. The pipe-end-connecting joint according to claim 1, wherein said synthetic resin pipe includes a plurality of reinforcing yarn members and a direct pressure of said spiral protruding portion prevents said plurality of reinforcing yarn members from moving from a cut end portion of the pipe toward a longitudinally inner side of the pipe, and
wherein said plurality of reinforcing yarn members are disposed in the pipe so as to be parallel with a longitudinal direction of the pipe.

13. The pipe-end-connecting joint according to claim 1, wherein the elastic packing formed at said first longitudinal end side includes a spiral corrugated inner surface coinciding with the outer surface of the pipe, each of the two split parts being held between a semicircular arc-shaped inner surface and the outer surface of the pipe due to a pressure pressing the two half portions into the peripheral surfaces of the pipe.

14. The pipe-end-connecting joint according to claim 1, wherein said spiral protruding portion of said holder directly contacts said trough portion of the synthetic resin pipe.

15. A pipe-end-connecting joint connectable to a pipe end of a pipe having a spiral corrugated outer circumferential surface, said joint comprising:
a nipple adapted to be inserted in a pipe end;
a holder for tightening the outer circumference of the pipe end; and
a packing attached in said holder, said packing having an inner surface shaped like a semicircular arc,
wherein said nipple includes a tubular portion provided in one longitudinal end side thereof so as to be insertable in the pipe end, a connection portion provided in another longitudinal end side of said nipple so as to be connected to another joint, and a flange portion provided in a longitudinal intermediate portion of said nipple so as to protrude outwardly,
wherein said spiral protruding portion has a hardness greater than that of said packing,
wherein said packing is fitted in a first ring-like groove, and
wherein said packing formed at said first longitudinal end side presses against said synthetic resin pipe in a direction towards said nipple.

16. The pipe-end-connecting joint according to claim 15, wherein said joint is connectable to a pipe end of a pipe comprising a synthetic resin material.

17. The pipe-end-connecting joint according to claim 15, wherein said packing comprises an elastic material.

18. The pipe-end-connecting joint according to claim 15, wherein said packing includes two half parts.

19. The pipe-end-connecting joint according to claim 15, wherein said holder is divided longitudinally into two split parts forming a semicircular inner circumferential surface.

20. The pipe-end-connecting joint according to claim 19, wherein said holder comprises a longitudinal end side in which said packing is mounted.

21. The pipe-end connecting joint according to claim 19, wherein said holder comprises a longitudinal end side in which a second ring-like groove is formed so as to be fitted to said flange portion.

22. The pipe-end-connecting joint according to claim 19, wherein said holder comprises first and second longitudinal end sides and a longitudinally intermediate portion between said first and second longitudinal end sides of said holder, a spiral corrugated portion being formed on the longitudinally intermediate portion of said holder.

23. The pipe-end-connecting joint according to claim 22, wherein said spiral corrugated portion comprises a spiral protruding portion, an inner diameter of which is smaller than an outer diameter of a trough portion of a spiral corrugated outer circumferential surface of a pipe.

24. The pipe-end-connecting joint according to claim 18, wherein each of said half parts has a spiral corrugated inner circumferential surface which substantially meets with said outer circumferential surface of said pipe.

25. The pipe-end-connecting joint according to claim 20, wherein said holder comprises another longitudinal end side in which a ring-like groove is formed so as to be fitted to said flange portion.

26. The pipe-end-connecting joint according to claim 23, wherein said spiral protruding portion presses said trough portion of said spiral corrugated outer circumferential surface of a synthetic resin pipe in a direction towards a side of said nipple.

27. The pipe-end-connecting joint according to claim 15, wherein a portion of the pipe distal to a cut end of the pipe is subjected to a planar pressure contact by said packing.

28. The pipe-end-connecting joint according to claim 15, wherein said synthetic resin pipe includes a plurality of reinforcing yarn members and a direct pressure of said spiral protruding portion prevents said plurality of reinforcing yarn members from moving from a cut end portion of the pipe toward a longitudinally inner side of the pipe, and
wherein said plurality of reinforcing yarn members are disposed in the pipe so as to be parallel with a longitudinal direction of the pipe.

29. The pipe-end-connecting joint according to claim 15, wherein said spiral protruding portion of said holder directly contacts said trough portion of the synthetic resin pipe.

30. The pipe-end-connecting joint according to claim 21, wherein a width of said first ring-like groove is greater than a width of said second ring-like groove.

31. A pipe-end-connecting joint connectable to a pipe end of a synthetic resin pipe having a spiral corrugated outer circumferential surface, said joint comprising:

a nipple adapted to be inserted in a pipe end;

a holder for tightening the outer circumference of a pipe end; and an elastic packing attached in said holder, said elastic packing including two half parts each having an inner surface shaped like a semicircular arc, wherein said nipple includes a tubular portion provided in one longitudinal end side thereof so as to be insertable in a pipe end, a connection portion provided in the other longitudinal end side thereof so as to be connected to another joint, and a flange portion provided in a longitudinal intermediate portion thereof so as to protrude outward, wherein said holder is divided longitudinally into two split parts, each of said two split parts forming a semicircular inner circumferential surface and comprising:

a first longitudinal end side in which one of said half parts of said elastic packing is mounted;

a second longitudinal end side in which a ring-like groove is formed so as to be fitted to said flange portion; and a longitudinally intermediate portion between said first and second longitudinal end sides, a spiral corrugated portion being formed on said longitudinally intermediate portion of said holder to substantially fit the spiral corrugated outer circumferential surface of a synthetic resin pipe, said spiral corrugated portion having a spiral protruding portion an inner diameter of which is smaller than an outer diameter of a trough portion of a spiral corrugated outer circumferential surface of a synthetic resin pipe, wherein said spiral protruding portion has a hardness greater than that of said elastic packing, wherein a portion of the pipe distal to a cut end of the pipe is subjected to a planar pressure contact by said elastic packing, and wherein the trough portion of the pipe is directly contacted by said spiral protruding portion.

32. A pipe-end-connecting joint connectable to a pipe end of a pipe having a spiral corrugated outer circumferential surface, said joint comprising:

a nipple adapted to be inserted in a pipe end;

a holder for tightening the outer circumference of a pipe end; and a packing attached in said holder, said packing having an inner surface shaped like a semicircular arc, wherein said nipple includes a tubular portion provided in one longitudinal end side thereof so as to be insertable in a pipe end, a connection portion provided in another longitudinal end side of said nipple so as to be connected to another joint, and a flange portion provided in a longitudinal intermediate portion of said nipple so as to protrude outwardly, wherein said spiral protruding portion has a hardness greater than that of said elastic packing, wherein a portion of the pipe distal to a cut end of the pipe is subjected to a planar pressure contact by said packing, and wherein a trough portion of the pipe is directly contacted by a protruding portion of said holder.

* * * * *